Aug. 3, 1965  MASUMI KATO ETAL  3,197,796
DRIVING DEVICE FOR A WINDOW WIPER
Filed July 30, 1963 2 Sheets-Sheet 1
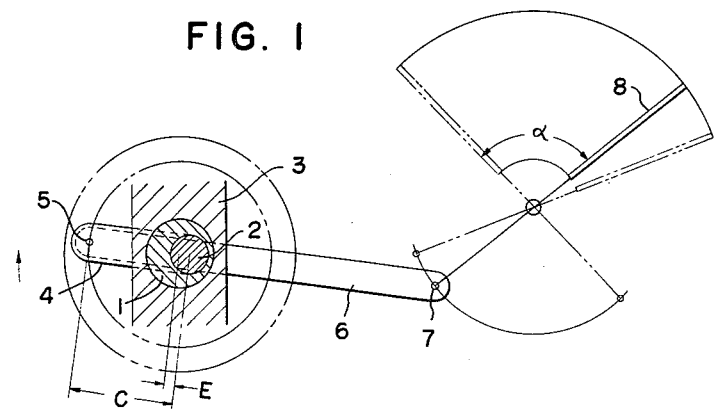
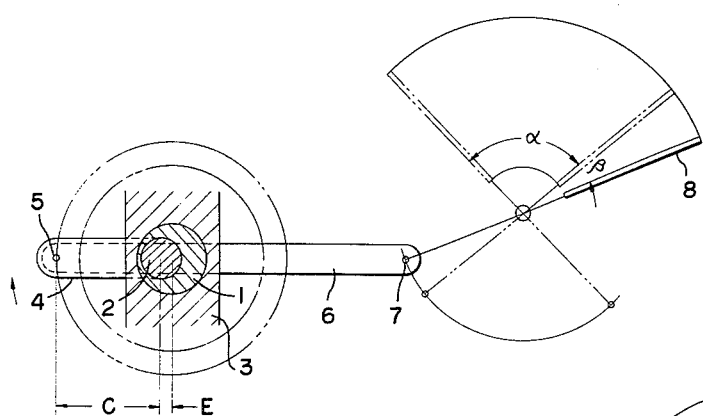
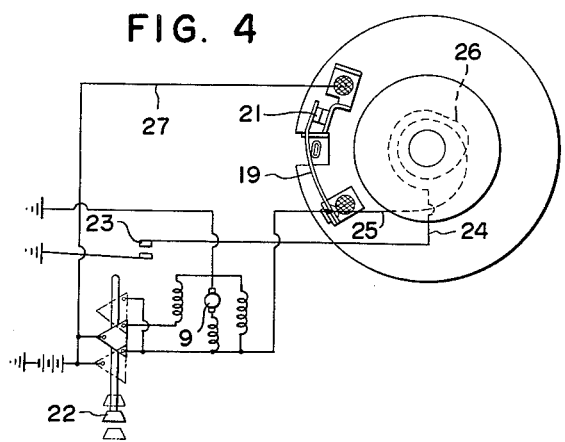
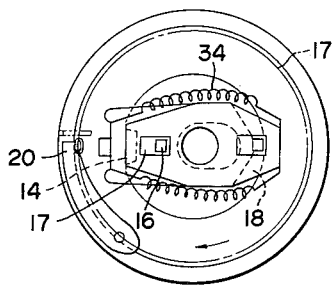
INVENTORS
MASUMI KATO
YASUHIKO AMANO
BY McGlew and Toren
ATTORNEY.

Aug. 3, 1965

MASUMI KATO ETAL 3,197,796

DRIVING DEVICE FOR A WINDOW WIPER

Filed July 30, 1963

2 Sheets-Sheet 2

INVENTORS
Masumi KATO
Yasuhiko AMANO
BY
McGlew and Tuero
ATTORNEYS

United States Patent Office

3,197,796
Patented Aug. 3, 1965

3,197,796
DRIVING DEVICE FOR A WINDOW WIPER
Masumi Kato, Aichi-gun, Aichi-ken, and Yasuhiko Amano, Toyota-shi, Aichi-ken, Japan, assignors to Nippon Denso Kabushiki Kaisha, Aichi-ken, Japan
Filed July 30, 1963, Ser. No. 298,661
Claims priority, application Japan, Aug. 10, 1962, 37/33,042
6 Claims. (Cl. 15—250.17)

Lately, driving mechanisms for windshield wipers, of the kind in which the wiper arm moves within a determined range so as to avoid striking the windshield frame and stops automatically at the lower frame of the windshield with "off" or "parked" position, have been proposed. In a usual driving device of this kind, it is necessary to provide the driving gear with a zig-zag cam slot, and to arrange a plurality of means on the circumference of the gear in order to put in or pull out pins in engagement with the slot, while it is required to energize an electromagnet constantly during the operation of a driving motor. Accordingly, the device has the disadvantages that its bulk is excessive and that its installation is restricted. In addition to these shortcomings, it is complicated and expensive, and imposes a large power drain.

In order to remove the above mentioned shortcomings, the windshield wiper driving mechanism according to the present invention is provided with a clutch plate which is arranged between and coaxially to a driving gear and a driving plate, and is able to slide radially. By engaging a recess of the gear with a finger of the clutch plate, the gear either can rotate together with a crank shaft or can run idle. Accordingly, in an operating position of a wiper arm, the clutch plate engages the gear and causes rotation of the crank shaft together with the driving gear, while in a parked position of the wiper arm, the clutch plate is released from engagement with the gear, in a determined position, by means of an electromagnetically operated cam plate, and stops the crank shaft only in that position. The gear, however, rotates further to carry out eccentric motion and increases the radius of the crank, and, in the position of the maximum radius of the crank, a motor driving the gear is cut out from its power supply, so that the wiper arm coupled to the crank is automatically stopped and parked in a determined position.

The accompanying drawings illustrate an embodiment of the invention, in which:

FIG. 1 and FIG. 2 are explanatory views illustrating the principle of the invention, FIG. 1 showing the wiper arm in an operating position, while FIG. 2 shows it in a parked position.

Figure 3:
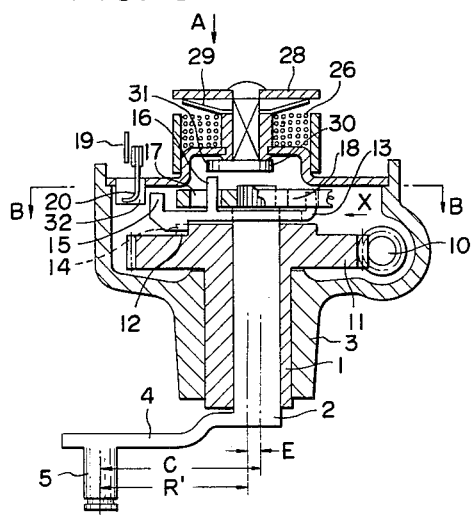
Figure 9:
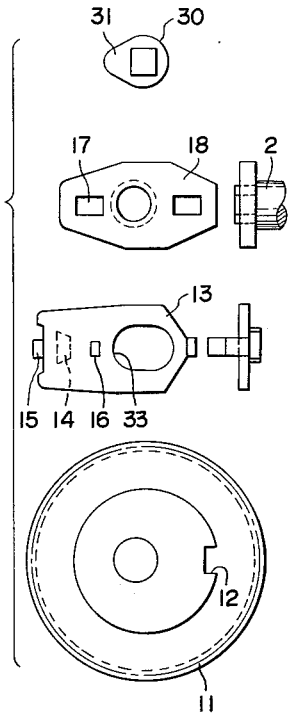

FIG. 3 is a diametric cross-sectional and part elevational view illustrating an embodiment of the mechanism in detail, in an operating position, FIG. 4 is a top view in the direction of the arrow A shown in FIG. 3, also illustrating the electrical connection diagram, FIG. 5 is a sectional view taken along the line B—B of FIG. 3, FIG. 6, FIG. 7 and FIG. 8 are views corresponding relatively to FIG. 3, FIG. 4 and FIG 5 but illustrating the mechanism in the parked position of the wiper, FIG. 9 illustrates top and side views of the essential parts of the embodiment.

In FIG. 1, showing a wiper arm in an operating position, an eccentric shaft 1 is rotated by a motor (not shown) through a speed reduction gear. A crank shaft 2 extends rotatably through the eccentric shaft 1 at a position in which the center of the crank shaft deviates by an eccentricity E from that of the eccentric shaft, and is coupled to rotate as a unit with eccentric shaft 1. A crank 4 and a crank pin 5 are made integral with the crank shaft 2, whereby the crank pin 5 rotates in a bearing 3 with a radius C–E. An end of a rod 6 is connected to the crank 4 by the pin 5, and the other end is similarly connected to a wiper arm 8 by a pin 7, so the wiper arm 8 swings through a wiping range of an angle $\alpha$.

In FIG. 2, showing the wiper arm 8 in a parked position, the crank shaft 2 is uncoupled from the eccentric shaft 1, and the eccentricity E is added to C, so that the radius of rotation of the pin 5 becomes C+E. Accordingly, the pin 5 pulls the rod 6 by an extra distance 2E and the wiper arm 8 swings further through the angle of $\beta$ so as to be parked at the lower frame of the windshield. At the same time, the motor is cut off from the power supply, so the wiper arm is parked at the lower frame.

FIG. 3–FIG. 5 show the driving device in detail in an operating position, wherein rotation of a worm 10 driven by the motor 9 (see FIG. 4) is transmitted to a worm gear 11 and causes rotation of the eccentric shaft 1 with its clutching recess 12, in the bearing 3. By this torque, a clutch plate 13, having a finger 14 engaging the recess 12, and a driving plate 18, having an aperture 17 receiving a projection 16 of the clutch plate, are brought into rotation. Therefore, the crank shaft 2, fixed to the driving plate 18, the crank arm 4 and the chank pin 5 rotate as a unit and carry out the wiping motion.

Figure 6:
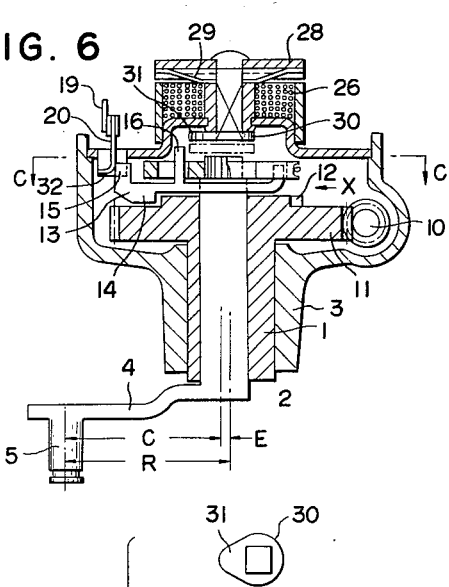
Figure 7:
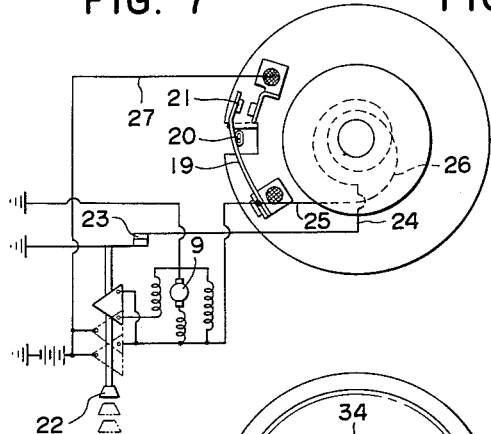
Figure 8:
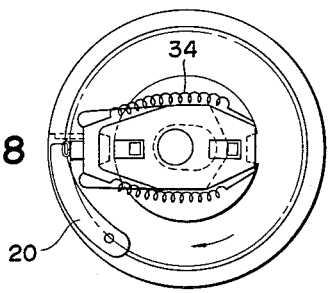

FIG. 6–FIG. 8 show the driving device in a parked position. When a push button switch 22 is set in a parked position in order to park the device, an end 24 of an electromagnetic coil 26 is connected to a negative potential through closed contacts 23, while the other end 25 of the coil 26 is connected to a positive potential through a head wire 27 and a contact 21 on a spring leaf 19, which latter remains closed, as shown in FIG. 4, till the completion of the parking of the wiper. The electromagnetic coil 26 is therefore energized and pulls an armature plate 28 against the force of a spring plate 29, so that a cam plate 30 fixed to the armature plate 28 moves downwards as shown in FIG. 1. A radially projecting part 31 of the cam plate 30 engages the upper end of the projection 16 of the clutch plate 13 in the position as shown in FIG. 3. As the motor continues to rotate, the clutch plate 13 also rotates further. When the clutch plate 13 rotates about 180° further and the projection 16 reaches the opposite side of the projecting part 31 of the cam plate 30, the cam plate moves further downwards as shown with a chain line in FIG. 6. In case the switch 22 remains set, in such position of the projection 16, the cam plate drops directly to the final position. As the motor rotates further, the projection 16 slides along the periphery of the cam plate 30 and moves in the direction of the arrow X, together with the finger 14 and the projection 15. When the projection 15 touches a stopper plate 32, rotation of the clutch plate 13 is stopped. At the same time, the finger 14 is released from engagement with the recess 12 of the gear 11, so that the crank shaft 2 stops. As the projection 15 is so constructed that it does not touch a lever 20, the contact 21 is still closed, so that the motor continues to rotate and drives the gear 11 only. Accordingly, the crank shaft 2 carries out eccentric motion as shown in FIG. 1 and FIG. 2, and clutch plate 13 moves further, in the direction of arrow X, with the crank shaft and parks the wiper arm 8 at the lower frame of the windshield. Just before the parking operation of the wiper, the projection 15 pushes the lever 20 to the left and opens the contact 21 on the spring leaf 19, so that the motor 9 is cut off from the power supply and stops. At the same time, the electromagnetic coil 20 is deenergized, so that the cam plate 30 is lifted by the action of the spring plate 29. The final position of the device is shown in FIGS. 6 to 8.

In one embodiment of the invention, the amount of the movement of the projection 16 along the periphery of the projecting part 31 of the cam plate in the direction of the arrow X is selected as 3 mm. Therefore, when the projection 16 completes its movement by means of the cam plate, clearance between the left wall 33 of the slot of the clutch plate 13 and the circumferential surface of the crank shaft 2 becomes 3 mm. On the other hand, the eccentricity is selected as 2 mm. Therefore, when rotation of the crank 4 is stopped in the position as shown in FIG. 1 and the eccentric shaft 1 is rotated by 180°, the pin 5 moves to the left by 4 mm. Owing to the above combination, the contact 21 is held closed until the eccentric motion becomes 3 mm. and is opened by the last 1 mm. motion.

Next, when the switch 22 in FIG. 7 is pulled in order to operate the device, the motor circuit is energized, so that the motor 9 starts. As the recess 12 of the gear is not yet in engagement with the finger 14 of the clutch plate 13 as shown in FIG. 6, the gear 11 only rotates. After the gear has rotated about 180°, engagement of the recess with the finger is made by the action of a return spring 34 which pulls the finger 14 to the center of the crank shaft 2. This return spring also serves to keep the cam 31 in touch with the projection 16. At the same time, when the gear 11 engages the clutch plate 13, the projection 15 is detached from the stopper plate 32, with the result that the gear rotates together with the crank shaft as in FIGS. 3 to 5.

From the above description and the drawings it will be understood that the components of the device are arranged coaxially to the gear. Namely, it is clear from FIG. 8 that the whole device has nearly the same dimension as conventional wipers without the housing mechanism of the wiper arm. Furthermore, the present invention has a great advantage in reduced power drain by the electromagnetic coil, as well as in weight and cost of the device.

Having thus described the invention, what is claimed as new and desired to be secured by Letters Patent, is:

1. Driving mechanism for an oscillatably mounted motor vehicle windshield wiper, said driving mechanism comprising, in combination, a rotatable driving gear; a motor driving said gear; a source of potential; a crank shaft rotatably mounted in said gear with its axis radially displaced by a preset eccentricity from the axis of said gear, and including a crank arm having a crank pin on its outer end coupled to the wiper to oscillate the latter; a clutch plate mounted on said gear for rotation coaxially of said gear and displacement radially thereof between a first position, in which said clutch plate is coupled to said gear to rotate therewith, and a second position, in which said clutch plate is uncoupled from said gear; means coupling said crank shaft and said clutch plate for conjoint rotation and relative radial displacement, said crank arm, when said clutch plate is coupled to said gear, having an effective radius equal to the spacing of the axes of said crank shaft and crank pin less said preset eccentricity; whereby, when said clutch plate is coupled to said gear, the wiper is oscillated through a first preset angle; electromagnetically operated cam means operable, when energized, to engage said clutch plate and displace it radially to said second position; a control switch having an on position connecting said motor to said source, and an off position disconnecting said motor from said source and connecting said electromagnetically operated cam means to said source through normally closed switch means; and stop means engageable by said clutch plate in its second position and effective to arrest rotation of said clutch plate and said crank shaft at a predetermined angular position thereof; whereby, upon continued rotation of said gear, said crank shaft is shifted diametrically of said gear to move the wiper through an additional angle proportional to said preset eccentricity to park the wiper in a position outside said first preset angle; said clutch plate, as said crank shaft nears its limit of such shifting, opening said switch means to de-energize said electromagnetically operated cam means.

2. Driving mechanism for an oscillatably mounted motor vehicle windshield wiper, said driving mechanism comprising, in combination, a rotatable driving gear; a motor driving said gear; a source of potential; a crank shaft rotatably mounted in said gear with its axis radially displaced by a preset eccentricity from the axis of said gear, and including a crank arm having a crank pin on its outer end coupled to the wiper to oscillate the latter; a clutch plate mounted on said gear for rotation coaxially of said gear and displacement radially thereof between a first position, in which said clutch plate is coupled to said gear to rotate therewith, and a second position, in which said clutch plate is uncoupled from said gear; means coupling said crank shaft and said clutch plate for conjoint rotation and relative radial displacement, said crank arm, when said clutch plate is coupled to said gear, having an effective radius equal to the spacing of the axes of said crank shaft and crank pin less said preset eccentricity; whereby, when said clutch plate is coupled to said gear, the wiper is oscillated through a first preset angle; electromagnetically operated cam means operable, when energized, to engage said clutch plate and displace it radially to said second position; a control switch having an on position connecting said motor to said source, and an off position disconnecting said motor from said source and connecting said electromagnetically operated cam means to said source through a normally closed switch means; and stop means engageable by said clutch plate in its second position and effective to arrest rotation of said clutch plate and said crank shaft at a predetermined angular position thereof; whereby, upon continued rotation of said gear, said crank shaft is shifted diametrically of said gear to move the wiper through an additional angle proportional to said preset eccentricity to park the wiper in a position outside said first preset angle; said clutch plate, as said crank shaft nears its limit of such shifting, opening said switch means to de-energize said electromagnetically operated cam means; said means coupling said crank shaft and said clutch plate comprising a driving plate fixed to rotate with said shaft, and pin and slot means interconnecting said driving plate and said clutch plate for conjoint rotation and relative radial displacement.

3. Driving mechanism for an oscillatably mounted motor vehicle windshield wiper, said driving mechanism comprising, in combination, a rotatable driving gear; a motor driving said gear; a source of potential; a crank shaft rotatably mounted in said gear with its axis radially displaced by a preset eccentricity from the axis of said gear, and including a crank arm having a crank pin on its outer end coupled to the wiper to oscillate the latter; a clutch plate mounted on said gear for rotation coaxially of said gear and displacement radially thereof between a first position, in which said clutch plate is coupled to said gear to rotate therewith, and a second position, in which said clutch plate is uncoupled from said gear; means coupling said crank shaft and said clutch plate for conjoint rotation and relative radial displacement, said crank arm, when said clutch plate is coupled to said gear, having an effective radius equal to the spacing of the axes of said crank shaft and crank pin less said preset eccentricity; whereby, when said clutch plate is coupled to said gear, the wiper is oscillated through a first preset angle; electromagnetically operated cam means operable, when energized, to engage said clutch plate and displace it radially to said second position; a control switch having an on position connecting said motor to said source, and an off position disconnecting said motor from said source and connecting said electromagnetically operated cam means to said source through a normally closed switch means; stop means engageable by said clutch plate in its second position and effective to arrest rotation of said clutch plate and said crank shaft at a predetermined angular position thereof; whereby, upon continued rotation of said gear, said crank shaft is shifted diametrically of said gear to move the wiper through an additional angle proportional to said preset eccentricity to park the wiper in a position outside said first preset angle; said clutch plate, as said crank shaft nears its limit of such shifting, opening said switch means to de-energize said electromagnetically operated cam means; and spring means engaged between said driving gear and said clutch plate and biasing said clutch plate toward its first position.

4. Driving mechanism for an oscillatably mounted motor vehicle windshield wiper, said driving mechanism comprising, in combination, a rotatable driving gear; a motor driving said gear; a source of potential; a crank shaft rotatably mounted in said gear with its axis radially displaced by a preset eccentricity from the axis of said gear, and including a crank arm having a crank pin on its outer end coupled to the wiper to oscillate the latter; a clutch plate mounted on said gear for rotation coaxially of said gear and displacement radially thereof between a first position, in which said clutch plate is coupled to said gear to rotate therewith, and a second position, in which said clutch plate is uncoupled from said gear; means coupling said crank shaft and said clutch plate for conjoint rotation and relative radial displacement, said crank arm, when said clutch plate is coupled to said gear, having an effective radius equal to the spacing of the axis of said crank shaft and crank pin less said preset eccentricity; whereby, when said clutch plate is coupled to said gear, the wiper is oscillated through a first preset angle; electromagnetically operated cam means operable, when energized, to engage said clutch plate and displace it radially to said second position, a control switch having an on position connecting said motor to said source, and an off position disconnecting said motor from said source and connecting said electromagnetically operated cam means to said source through a normally closed switch means; and stop means engageable by said clutch plate in its second position and effective to arrest rotation of said clutch plate and said crank shaft at a predetermined angular position thereof; whereby, upon continued rotation of said gear, said crank shaft is shifted diametrically of said gear to move the wiper through an additional angle proportional to said preset eccentricity to park the wiper in a position outside said first preset angle; said clutch plate, as said crank shaft nears its limit of such shifting, opening said switch means to de-energize said electromagnetically operated cam means; said means coupling said crank shaft and said clutch plate comprising a driving plate fixed to rotate with said shaft, and pin and slot means interconnecting said driving plate and said clutch plate for conjoint rotation and relative radial displacement; said clutch plate being disposed axially between said gear and said driving plate.

5. Driving mechanism for an oscillatably mounted motor vehicle windshield wiper, said driving mechanism comprising, in combination a rotatable driving gear; a motor driving said gear; a source of potential; a crank shaft rotatably mounted in said gear with its axis radially displaced by a preset eccentricity from the axis of said gear, and including a crank arm having a crank pin on its outer end coupled to the wiper to oscillate the latter; a clutch plate mounted on said gear for rotation coaxially of said gear and displacement radially thereof between a first position, in which said clutch plate is coupled to said gear to rotate therewith, and a second position, in which said clutch plate is uncoupled from said gear; means coupling said crank shaft and said clutch plate for conjoint rotation and relative radial displacement, said crank arm, when said clutch plate is coupled to said gear, having an effective radius equal to the spacing of the axes of said crank shaft and crank pin less said preset eccentricity; whereby, when said clutch plate is coupled to said gear, the wiper is oscillated through a first preset angle; electromagnetically operated cam means operable, when energized, to engage said clutch plate and displace it radially to said second position; a control switch having an on position connecting said motor to said source, and an off position disconnecting said motor from said source and connecting said electromagnetically operated cam means to said source through a normally closed switch means; and stop means engageable by said clutch plate in its second position and effective to arrest rotation of said clutch plate and said crank shaft at a predetermined angular position thereof; whereby, upon continued rotation of said gear, said crank shaft is shifted diametrically of said gear to move the wiper through an additional angle proportional to said preset eccentricity to park the wiper in a position outside said first preset angle; said clutch plate, as said crank shaft nears its limit of such shifting, opening said switch means to de-energize said electromagnetically operated cam means; said driving gear having an axially elongated hub, and said crank shaft extending longitudinally through said hub and through said driving gear.

6. Driving mechanism for an oscillatably mounted motor vehicle windshield wiper, said driving mechanism comprising, in combination, a rotatable driving gear; a motor driving said gear; a source of potential; a crank shaft rotatably mounted in said gear with its axis radially displaced by a preset eccentricity from the axis of said gear, and including a crank arm having a crank pin on its outer end coupled to the wiper to oscillate the latter; a clutch plate mounted on said gear for rotation coaxially of said gear and displacement radially thereof between a first position, in which said clutch plate is coupled to said gear to rotate therewith, and a second position, in which said clutch plate is uncoupled from said gear; means coupling said crank shaft and said clutch plate for conjoint rotation and relative radial displacement, said crank arm, when said clutch plate is coupled to said gear, having an effective radius equal to the spacing of the axes of said crank shaft and crank pin less said preset eccentricity; whereby, when said clutch plate is coupled to said gear, the wiper is oscillated through a first preset angle; electromagnetically operated cam means operable, when energized, to engage said clutch plate and displace it radially to said second position; a control switch having an on position connecting said motor to said source, and an off position disconnecting said motor from said source and connecting said electromagnetically operated cam means to said source through a normally closed switch means; and stop means engageable by said clutch plate in its second position and effective to arrest rotation of said clutch plate and said crank shaft at a predetermined angular position thereof; whereby, upon continued rotation of said gear, said crank shaft is shifted diametrically of said gear to move the wiper through an additional angle proportional to said preset eccentricity to park the wiper in a position outside said first preset angle; said clutch plate, as said crank shaft nears its limit of such shifting, opening said switch means to de-energize said electromagnetically operated cam means; said stop means being angularly displaceable to preset the angular position at which rotation of said clutch plate and said crank shaft is arrested.

References Cited by the Examiner
UNITED STATES PATENTS 2,761,537    9/56    Short et al. _____ 192—102
3,025,552    3/62    Contant _____ 15—250.16

FOREIGN PATENTS 956,140    7/49    France.

CHARLES A. WILLMUTH, Primary Examiner.

DAVID J. WILLIAMOWSKY, Examiner.